(12) United States Patent
Mansour et al.

(10) Patent No.: US 10,351,136 B2
(45) Date of Patent: Jul. 16, 2019

(54) METHOD FOR CONTROLLING A ROLLING MODE OR A FREEWHEEL MODE OF A VEHICLE

(71) Applicant: ZF Friedrichshafen AG, Friedrichshafen (DE)

(72) Inventors: Rachid Mansour, Markdorf (DE); Maik Würthner, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 61 days.

(21) Appl. No.: 15/831,682

(22) Filed: Dec. 5, 2017

(65) Prior Publication Data

US 2018/0162402 A1 Jun. 14, 2018

(30) Foreign Application Priority Data

Dec. 8, 2016 (DE) .................. 10 2016 224 511

(51) Int. Cl.
*B60W 30/18* (2012.01)
*B60W 40/076* (2012.01)
(Continued)

(52) U.S. Cl.
CPC ...... *B60W 30/18072* (2013.01); *B60W 10/11* (2013.01); *B60W 30/14* (2013.01);
(Continued)

(58) Field of Classification Search
None
See application file for complete search history.

(56) References Cited

U.S. PATENT DOCUMENTS

| 8,494,737 B2 * | 7/2013 | Maier | B60W 10/02 |
| | | | 701/65 |
| 8,521,379 B2 * | 8/2013 | Wurthner | B60W 10/02 |
| | | | 477/107 |

(Continued)

FOREIGN PATENT DOCUMENTS

| DE | 10 2006 054 327 A1 | 5/2008 |
| DE | 10 2009 028 242 A1 | 2/2011 |

(Continued)

OTHER PUBLICATIONS

German Search Report Corresponding to 10 2016 224 511.2 dated Jul. 25, 2017.

*Primary Examiner* — Dirk Wright
(74) *Attorney, Agent, or Firm* — Davis & Bujold PLLC; Michael J. Bujold

(57) ABSTRACT

A method for controlling a rolling or a freewheeling mode of a vehicle having a drive-train with an engine, an automatic or automated transmission and controllable means for interrupting force flow in the drive-train. A current vehicle position and a first road stretch, between the current vehicle position and a road stretch section ahead along which a speed limit applies, are determined. While driving with the drive-train engaged, for the road stretch section ahead, a predicted speed variation, if the force flow in the drive-train is interrupted, is calculated and, based this speed variation, a second road stretch is determined which the vehicle, with the force flow interrupted covers, until a value of the predicted speed variation corresponds to a value of the speed limit ahead. With regard to the determined road stretches, a road stretch point for initiating the rolling or freewheeling mode is determined.

10 Claims, 3 Drawing Sheets

(51) Int. Cl.
*B60W 40/105* (2012.01)
*B60W 10/11* (2012.01)
*B60W 30/14* (2006.01)
*B60W 50/00* (2006.01)

(52) U.S. Cl.
CPC ........ *B60W 40/076* (2013.01); *B60W 40/105* (2013.01); *B60W 50/0097* (2013.01); *B60W 30/18* (2013.01); *B60W 2030/1809* (2013.01); *B60W 2550/142* (2013.01); *B60W 2550/145* (2013.01); *B60W 2550/22* (2013.01); *B60W 2550/402* (2013.01); *Y02T 10/76* (2013.01)

(56) References Cited

U.S. PATENT DOCUMENTS

| | | | |
|---|---|---|---|
| 8,784,267 B2 * | 7/2014 | Staudinger | B60W 30/16 477/120 |
| 9,096,213 B2 * | 8/2015 | Larsson | B60W 10/02 |
| 9,139,197 B2 * | 9/2015 | Reed | B60W 10/02 |
| 9,598,083 B2 * | 3/2017 | Suzuki | F02N 11/0833 |
| 9,714,704 B2 * | 7/2017 | Johansson | B60W 30/18072 |
| 9,898,928 B1 * | 2/2018 | Payne | G08G 1/09626 |
| 2015/0298699 A1 | 10/2015 | Poechmueller et al. | |

FOREIGN PATENT DOCUMENTS

| | | |
|---|---|---|
| DE | 10 2011 103 096 A1 | 12/2012 |
| DE | 10 2011 119 008 A1 | 5/2013 |
| DE | 10 2012 213 321 A1 | 1/2014 |

* cited by examiner

METHOD FOR CONTROLLING A ROLLING MODE OR A FREEWHEEL MODE OF A VEHICLE

This application claims priority from German patent application serial no. 10 2016 224 511.2 filed Dec. 8, 2016.

FIELD OF THE INVENTION

The invention concerns a method for controlling a rolling mode or a freewheeling mode of a vehicle having a drive-train with a drive engine, an automatic or automated transmission and controllable shifting means for interrupting the force flow in the drive-train. In addition the invention concerns a control unit and a control device suitable for carrying out the method, and a computer program product for controlling the proposed method.

BACKGROUND OF THE INVENTION

In general, in the development of new motor vehicles and the further development of existing motor vehicles, especially utility vehicles, it is attempted to reduce fuel consumption and the emissions of harmful substances and $CO_2$. Besides the technical optimization of motor vehicles such as the development of low-consumption and low-emission drive engines, efficiency-optimized multi-stage change-speed transmissions, tires with low rolling resistance and aerodynamic car bodies, driver cabins and superstructures of trucks, a further possibility for reducing fuel consumption and the emissions of harmful substances and $CO_2$ relates to suitable driving operation control during the use of the motor vehicle.

To save energy and costs and to reduce environmental pollution, in appropriate driving situations a vehicle can continue to move ahead in a temporary rolling or freewheel mode with no propulsive drive. In particular, in a motor vehicle in the rolling mode the combustion engine can be operated in an idling mode in which the consumption and emissions are as low as possible while the vehicle is rolling with its drive-train open. If in such a driving situation the combustion engine is switched off in order to increase the saving effect even more, the vehicle moves in a so-termed freewheel mode. These functions are already known.

Depending on the drive-train components present and the design of the transmission, the force flow interruption can take place by shifting the transmission to neutral or by opening a starting clutch as soon as rolling or freewheeling becomes possible.

From DE 10 2009 028 242 A1 a method for controlling a rolling or freewheeling mode of a vehicle is already known. To enable as effective as possible, yet comfortable and reliable driving operation, a force flow interruption in the drive-train is permitted when the counter condition of a rolling or freewheeling mode counter is below a specified first threshold value or assumes the value zero, such that the rolling or freewheeling counter is incremented if at least one event stored in a event table occurs and otherwise the counter is decremented or kept the same. By virtue of the method according to DE 10 2009 028 242 A1 the driving condition of the vehicle and the topography that influences the vehicle are correctly interpreted in such manner that unnecessary shifts to neutral, i.e. neutral shifts that have no saving effect or which activate the rolling or freewheeling mode in situations when that is unwanted by the driver, or which are possibly safety-relevant, can be reliably avoided.

SUMMARY OF THE INVENTION

The purpose of the present invention is to provide a method for controlling the driving operation of a vehicle, which enables better operation in relation to the authorization of a rolling or freewheeling mode. In addition a transmission control unit, a control device and a computer program product for carrying out the method are indicated.

Accordingly, the invention begins with a method for controlling a rolling or freewheeling mode of a vehicle having a drive-train with a drive engine, an automatic or automated transmission and controllable shifting means for interrupting the force flow in the drive-train.

To achieve the stated objective the invention provides that a current vehicle position is determined, such that the current vehicle position can be located by a satellite location system such as GPS or GLONASS. With reference to topographical data, a first road stretch between the current vehicle position and a driving stretch ahead to which a speed limit applies is determined. The topographical data can be taken from a topographical map, for example stored in a transmission control unit or in a navigation system of the vehicle. For example, the topographical map contains height data and road sections with speed limits, such as urban areas or speed limits on motorways or overland stretches.

It is further envisaged that while driving with the drive-train engaged, a predicted speed variation for a road section ahead, with the force flow in the drive-train interrupted, is calculated. From height data derived from the topographical map, a variation of the road gradient or the driving resistance profile is determined for the road section ahead, in a manner known as such. From the variation of the road gradient or the driving resistance profile, and taking into account the current speed of the vehicle, the mass of the vehicle, the rolling resistance and the air resistance of the vehicle, the speed variation with the force flow interrupted is determined.

Depending on the predicted speed variation, a second road stretch is then determined which the vehicle would cover with the force flow interrupted, until a value of the predicted speed variation coincides at least approximately with a value of the speed limit ahead.

With regard to the road stretches so determined, it is finally provided to determine a road stretch point or vehicle position ahead of the vehicle at which initiation of the rolling or freewheeling mode is permitted.

A rolling mode is understood to mean the driving of a vehicle with the drive-train disengaged, i.e. a non-propelled forward movement or driving by utilizing the momentum of the vehicle with the drive engine running. A freewheel mode is understood to mean the driving of a vehicle with the drive-train disengaged and the drive engine switched off.

By virtue of the proposed method, by means of a pre-calculation of the speed variation in the rolling or freewheeling mode, a point along the road stretch ahead suitable for initiating the rolling or freewheel mode is determined in such manner that a road section ahead is reached at a driving speed which corresponds at least approximately to the speed limit assigned to the road section reached, without actuating a brake device of the vehicle. Besides the advantage of reducing the consumption of fuel, by virtue of the proposed method, the wear of a brake device of the vehicle can also be reduced in this way.

In an embodiment of the invention it is provided that between the road stretches determined, a difference is determined and a force flow interruption takes place at a point ahead of the vehicle which is ahead of the current vehicle position by the amount of the road stretch difference determined. In this way the vehicle position ahead, at which the force flow interruption should take place, is already known in advance and the force flow interruption can accordingly be prepared for by the transmission control unit.

In an alternative embodiment it is provided that the first road stretch and the second road stretch are continually compared with one another. The force flow interruption in the drive-train is then initiated at a vehicle position where the two road stretches determined correspond, at least approximately.

The authorization of the rolling or freewheeling mode can be linked with other conditions, which are evaluated and taken into account for example by a transmission control unit. For example it can be provided that the method for controlling a rolling or freewheeling mode is only implemented when a current driving speed is higher than the speed limit that lies ahead and the variation of the road gradient or the driving resistance profile until the forthcoming speed limit is known. Moreover, for the authorization of a force flow interruption, information about a set automatic brake control speed can be taken into account, so that the force flow interruption is only permitted if the predicted speed variation when the force flow in the drive-train is interrupted, is lower than the set automatic brake control speed.

The invention also concerns a transmission control unit which is designed to carry out the method according to the invention and consequently emits corresponding commands to initiate, carry out or terminate a rolling or freewheeling operating mode. The transmission control unit comprises means that serve to implement the method according to the invention. These means include both hardware means and software means. The hardware means include data interfaces for the exchange of data with assemblies of the drive-train involved in implementing the method according to the invention. For that purpose the transmission control unit is also connected to the necessary sensors and, where necessary, also to other control units such as the engine control unit and a navigation device, in order to receive the decision-relevant data and to pass on control commands. For example, the transmission control unit receives information about the current vehicle position, a current vehicle speed, and height data and road sections with speed limits lying ahead of the current vehicle position.

The hardware means of the transmission control device also include a processor for data processing and a memory for data storage. The software means consist of program blocks for implementing the method according to the invention.

The invention also concerns a control system of a vehicle, which contains among other things the transmission control unit according to the invention for the automated transmission, an engine control unit of a drive aggregate, and a navigation device of the vehicle, which are interlinked with one another in such manner that when carrying out the method according to the invention the transmission control unit actuates shifting means for interrupting the force flow in the drive-train when the vehicle reaches a road section point ahead of it at which the force flow interruption in the drive-train should be initiated. The transmission control unit, the engine control unit and the navigation device are preferably connected to one another, for example by way of a CAN bus.

The system according to the invention can also be incorporated as a computer program product which, when it is run on a processor of a control device, instructs the processor software to carry out the associated steps of the method that is the object of the invention. In this connection the object of the invention also includes a computer-readable medium on which a computer program product as described earlier is stored and can be called up.

The invention is not limited to the indicated combination of features specified in the associated claims or the claims that depend on them. There are in addition possibilities for combining individual features with one another, providing that they emerge from the claims, the description of embodiments given below, or directly from the drawings. The references in the claims to the drawings by the use of indexes is not intended to restrict the protective scope of the claims.

BRIEF DESCRIPTION OF THE DRAWINGS

To clarify the invention the description of a drawing with example embodiments is attached. The drawings show.

DETAILED DESCRIPTION OF THE PREFERRED EMBODIMENTS

Figure 1:
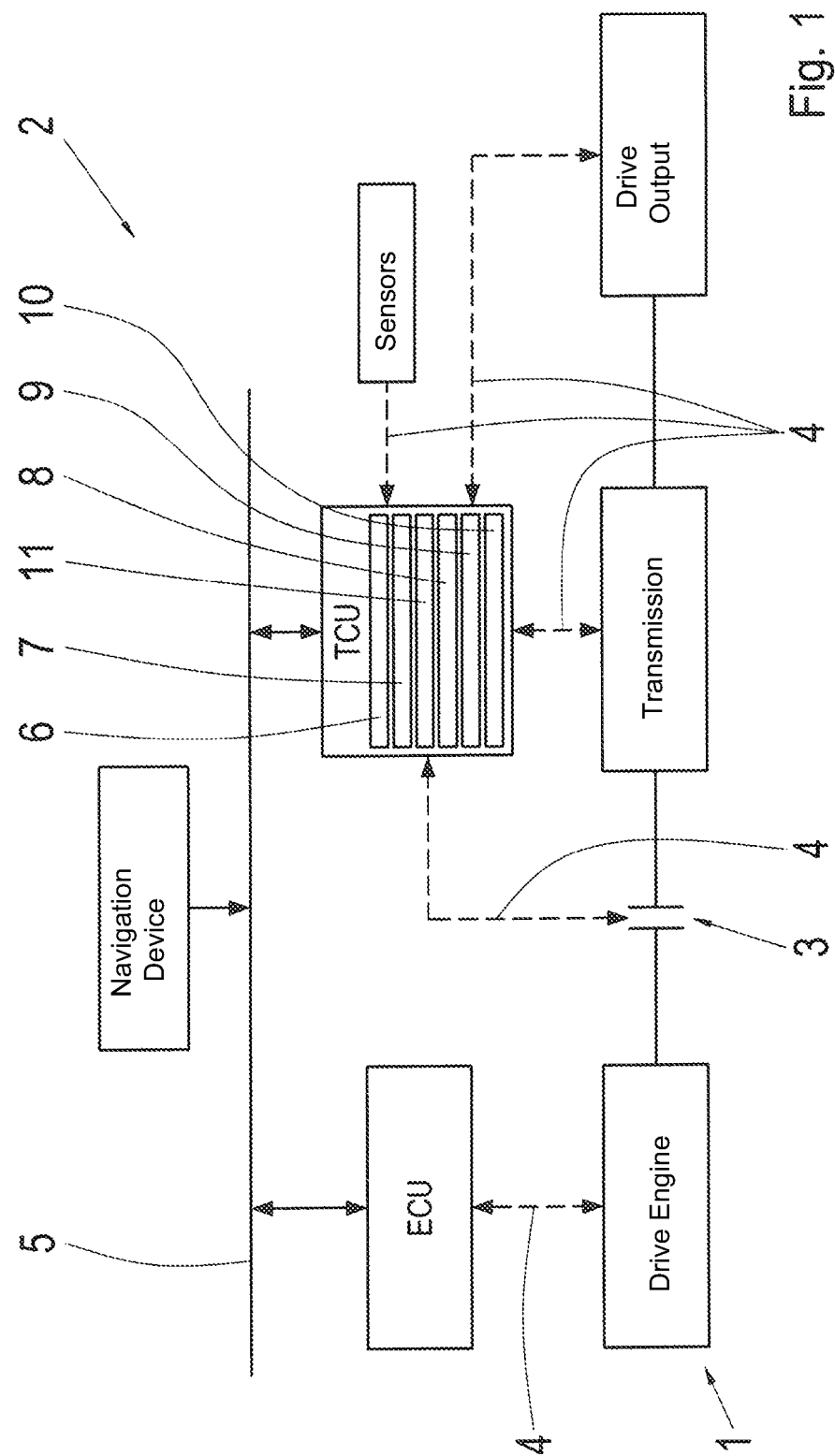
FIG. 1: A schematic representation of a drive-train with a control system according to the invention.

FIG. 1 shows a schematic representation of a drive-train 1 of a vehicle, which is a utility vehicle, for example a truck. In this case the drive-train 1 has a drive engine which on its output side can be coupled by way of an intermediate separator clutch 3 to a drive input side of an automated change-speed transmission. On the drive output side, the automated change-speed transmission is then connected to further output components of the utility vehicle long known to those familiar with the subject.

The vehicle also comprises a control system 2, in which a plurality of different control units are connected with one another by way of a data bus system 5, for example a CAN bus system. Among other things the data bus system 5 includes a transmission control unit TCU and an engine control unit ECU, of which the engine control unit ECU regulates the drive engine and the transmission control unit TCU regulates the automated change-speed transmission and—sometimes indirectly via a further control unit—also regulates the separator clutch 3. The transmission control unit TCU can communicate in both directions on the one hand with the transmission and on the other hand with the engine control unit ECU. The control units are supplied with the data relevant for them by way of the data bus system 5. The control units are able to receive sensor signals, process those signals, and as a function thereof emit control or data signals in order to control and regulate the proposed method for operating the drive-train 1.

Thus for example, the transmission control unit TCU comprises a processor 6 and storage means 7 for storing and recalling parameters, signals and information, and a computer program product 11 designed to be able to control the drive-train 1 and the transmission as required for the above-described method. In addition the transmission control unit TCU comprises at least one receiving interface 8 designed to receive all relevant data from sensors, from the engine control unit ECU and from the navigation device. The transmission control unit TCU also comprises a data processing device 9 in order to process and evaluate the data received, or information from the data received, and a sender interface 10 via which corresponding signals for the control of drive-train components can be emitted.

Data from sensors and from a navigation device are sent to the transmission control unit TCU. The navigation device provides topographical data about the current position of the vehicle and about the surroundings up to a given distance ahead of the current vehicle position. The current vehicle position can be located by means of a satellite location system such as GPS or GLONASS.

The transmission control unit TCU controls the operation of the transmission by virtue of vehicle condition data and driver's wish data. A shifting strategy stored in the transmission control unit TCU in the form of a computer program determines all the shift reactions, in particular a gearshift from a current actual gear to a target gear, or a temporary force flow interruption in the drive-train 1.

The driving condition data used can be the current driving resistance, the current inclination of the vehicle, the current vehicle speed, the current vehicle acceleration, the current engine torque, the current engine rotational speed, and other values. These data can be provided at least in part by the engine control unit ECU and by appropriate sensor devices.

Driver's wish data can for example be signaled by the actuation of an accelerator pedal or a brake pedal, detected by sensors and passed on directly or indirectly to the transmission control unit TCU.

The control system 2 also comprises means for actuating the automated transmission and the separator clutch 3. These means comprise suitable valves by means of which an actuator system of the automated transmission or the separator clutch can be controlled. The means comprise in each case a data-transmitting connection 4 to the control unit concerned. Thus, to produce the rolling or freewheeling mode a force flow interruption of the drive-train 1 can be initiated by shifting the transmission, by means of the transmission control unit TCU, to a neutral position or by opening the separator clutch 3 arranged between the drive engine and the transmission. If the vehicle is to be operated in a rolling mode, then the drive engine is preferably regulated to its idling rotational speed by the engine control unit ECU, where as to produce the freewheeling mode the drive engine is switched off by its control unit ECU.

The data-transmitting connections 4 between the control units and the components of the drive-train 1 can for example be in the form of one or more electronic bus systems.

Figure 2:
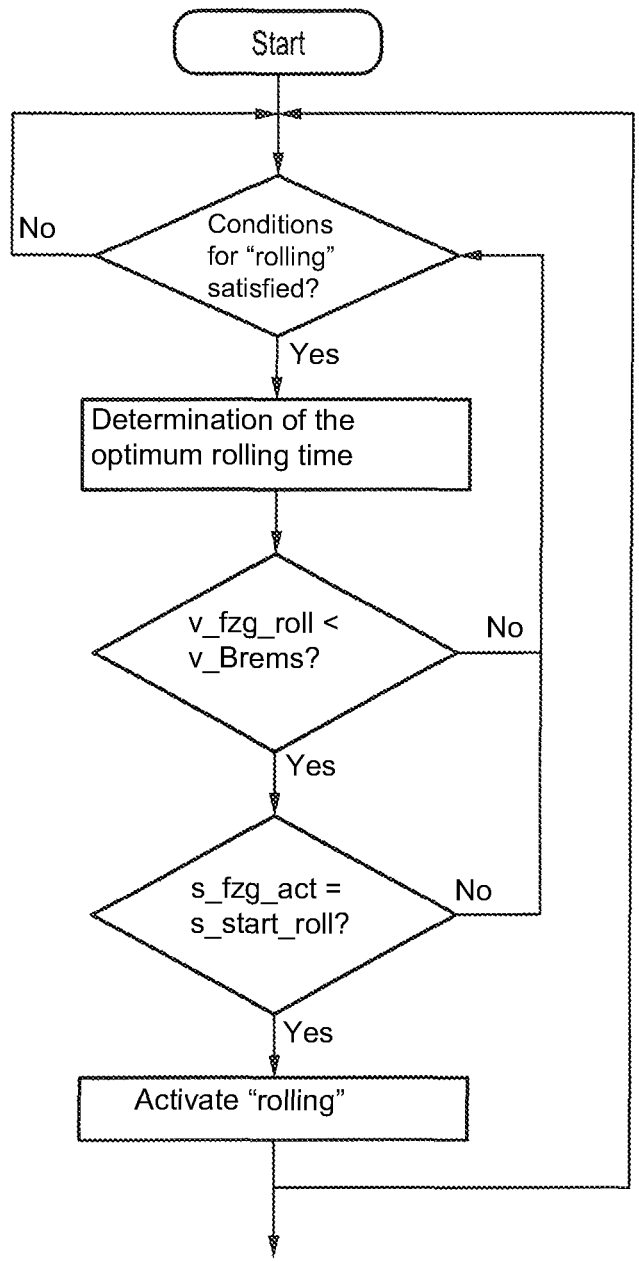
FIG. 2: A flow chart of a method according to the invention for the control of a rolling or freewheeling mode of a vehicle.
Figure 3:
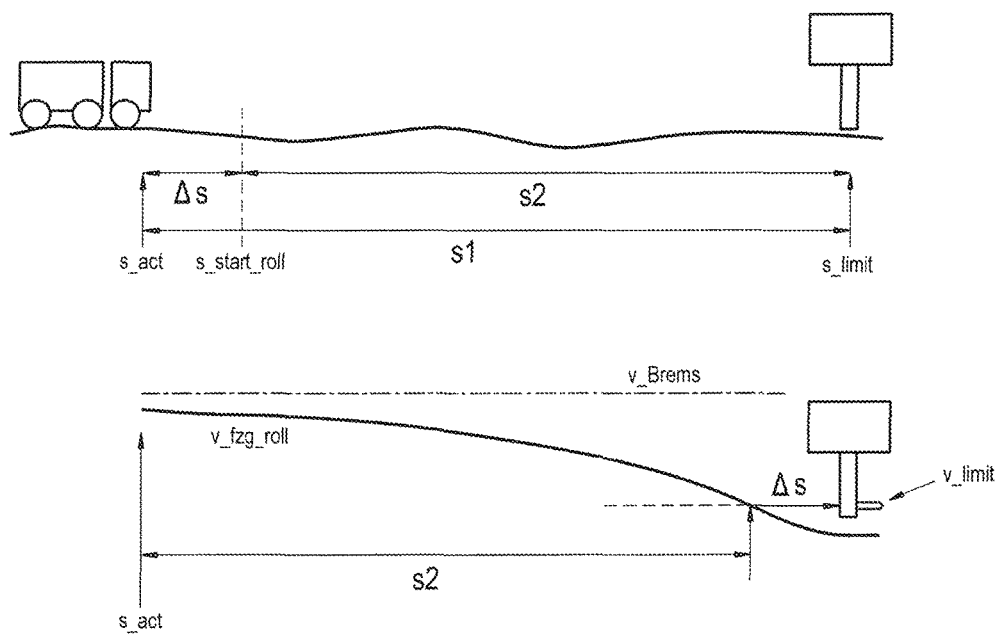
FIG. 3: A speed variation and road stretches, which are taken into account in the method according to the invention for controlling the rolling or freewheeling mode.

In the present case it is now provided that by pre-calculating the speed variation in the rolling or freewheeling mode, a road section point for triggering the rolling or freewheeling mode is determined in such manner that a stretch section ahead, along which a speed limit applies, is reached at a driving speed that corresponds at least approximately to the speed limit assigned to the stretch section. For this the drive-train 1 is controlled by the control system 2 as necessary for the method described above, which will now be explained with the help of FIGS. 2 and 3.

At the beginning of the process the vehicle is in driving operation. In a first step of the flow chart shown in FIG. 2, it is checked whether the prerequisites for the rolling or freewheeling mode are satisfied in a road section ahead of the vehicle.

For this, it is checked whether the current vehicle position s_act and a distance from the current vehicle position s_act to a road stretch point s_limit ahead of the vehicle, from which a speed limit v_limit applies, are known. For this the current vehicle position s_act is determined by means of a satellite location system and the distance from the road stretch point s_limit ahead, from which the speed limit v_limit applies, is determined by the navigation device of the vehicle. The current vehicle position s_act and the distance s_limit to the road stretch ahead are supplied to the transmission control unit TCU by way of a data connection.

As a further prerequisite for initiating the rolling or freewheeling mode, the road configuration of the stretch ahead of the vehicle is considered and evaluated, and for example the authorization for force flow interruption in the drive-train 1 is blocked if a tight bend or a stretch with many curves ahead of the vehicle is detected. The value of the current vehicle speed is also detected or determined and compared with the determined speed limit v_limit ahead, and a rolling or freewheeling mode is only authorized if the current vehicle speed is higher than the speed limit ahead.

Knowledge of the course of the driving resistance profile as far as the speed limit ahead and of the current vehicle mass are further prerequisites for authorizing the rolling or freewheeling mode, since with reference to these data a predicted speed variation v_fzg_roll for the road stretch ahead when the force flow in the drive-train 1 has been interrupted can be calculated. The shape of the driving resistance profile can be transmitted by the transmission control unit TCU with regard to height data from a topographical map transmitted to the transmission control unit TCU by the navigation device, in a manner known as such.

If the prerequisites for driving operation with an interrupted force flow in the drive-train 1 are satisfied, then in a further process step a road stretch point s_start_roll is determined, at which the rolling or freewheeling mode is initiated, this road stretch point s_start_roll being determined in such manner that the vehicle reaches the speed limit ahead at a driving speed that corresponds to the speed limit.

In this way a first road stretch s1 between the current vehicle position s_act and a road stretch section ahead with a speed limit s_limit is determined. While driving with the drive-train 1 engaged, for a road stretch section ahead and with reference to the known driving resistance profile ahead of the vehicle, taking account of the current vehicle speed, the mass of the vehicle, the rolling resistance and the air resistance of the vehicle, a speed variation v_fzg_roll is determined which ensues when the force flow in the drive-train 1 is interrupted. As a function of the predicted speed variation v_fzg_roll, a second road stretch s2 is determined, which the vehicle covers with the force flow interrupted until a value of the predicted speed variation v_fzg_roll coincides at least approximately with a value of the speed limit v_limit ahead of the vehicle.

Finally, between the road stretches s1, s2 determined, a difference Δs is determined, such that a force flow interruption in the drive-train takes place at a road stretch point s_start_roll that lies ahead of the vehicle, which is ahead of it by the amount of the road stretch difference Δs from the current vehicle position s_act.

In a further process step it can, for example, also be checked whether the predicted speed variation v_fzg_roll when the force flow in the drive-train has been interrupted, is smaller than a set automatic brake speed v_Brems. If this is not the case, then the rolling or freewheeling mode is not initiated. On the other hand, if the predicted speed variation v_fzg_roll is below the specified automatic brake speed v_Brems and the vehicle is at the road stretch point s_start_roll determined, then the rolling or freewheeling mode is permitted and the drive-train is interrupted.

Thus, by the method proposed, by means of an advance calculation of the speed variation v_fzg_roll in the rolling or freewheeling mode, a road stretch point s_start_roll for initiating the rolling or freewheeling mode is determined in such manner that a road stretch point s_limit ahead, along which a speed limit v_limit applies, is reached at a driving speed that corresponds at least approximately to the speed limit v_limit assigned to the road stretch reached, without operating a braking device of the vehicle.

Indexes

1 Drive-train
2 Control system
3 Clutch
4 Connection
5 Data bus system
6 Processor
7 Storage means
8 Receiver interface
9 Evaluation unit
10 Sender interface
11 Computer program product

The invention claimed is:

1. A method for controlling a rolling or a freewheeling mode of a vehicle having a drive-train with a drive engine, an automatic or an automated transmission and a controllable shifting mechanism for interrupting a force flow in the drive-train, the method comprising:
   determining a current vehicle position,
   determining, with reference to topographical data, a first road stretch between the current vehicle position and a road stretch section ahead along which a speed limit applies,
   calculating, while driving with the drive-train engaged, a predicted speed variation with the force flow in the drive-train interrupted for the road stretch section ahead,
   determining, as a function of the predicted speed variation, a second road stretch, which the vehicle covers with the force flow interrupted until a value of the predicted speed variation at least approximately corresponds to a value of the speed limit ahead, and
   determining, taking into account the first and the second determined road stretches, a road stretch point ahead of the vehicle or a vehicle position for initiating the rolling or the freewheeling mode.

2. The method according to claim 1, further comprising determining a difference between the first and the second determined road stretches, and initiating the rolling or the freewheeling mode at the road stretch point which is ahead of the current vehicle position by an amount of the determined road stretch difference.

3. The method according to claim 1, further comprising continually comparing the determined first road stretch and the determined second road stretch with one another, and initiating the rolling or the freewheeling mode at a vehicle position at which the first and the second determined road stretches at least approximately correspond.

4. The method according to claim 1, further comprising determining, from height data from the topographical data for the road stretch ahead, a variation of road gradient, and determining the speed variation with the force flow interrupted from the variation of road gradient by taking into account a current speed of the vehicle, a mass of the vehicle, a rolling resistance and an air resistance of the vehicle.

5. The method according to claim 1, further comprising deriving the topographical data from a topographical map which is stored either in a transmission control unit of the transmission or in a navigation device of the vehicle.

6. The method according to claim 1, further comprising only carrying out the method for controlling the rolling or the freewheeling mode when a current value of vehicle speed is higher than the value of the speed limit ahead and either a variation of road gradient or a driving resistance profile as far as the value of the speed limit ahead are known.

7. The method according to claim 1, further comprising only permitting a force flow interruption when the predicted speed variation is smaller than a set automatic brake speed.

8. A transmission control unit of a transmission, designed to carry out steps of a method for controlling a rolling or freewheeling mode of a vehicle having a drive-train with a drive engine, an automatic or automated transmission and controllable shifting means for interrupting a force flow in the drive-train, the method including: determining a current vehicle position; determining, with reference to topographical data, a first road stretch between the current vehicle position and a road stretch section ahead along which a speed limit applies; calculating, while driving with the drive-train engaged, a predicted speed variation with the force flow in the drive-train interrupted for the road stretch section ahead; determining, as a function of the predicted speed variation, a second road stretch, which the vehicle covers with the force flow interrupted until a value of the predicted speed variation corresponds at least approximately to a value of the speed limit ahead; and determining, taking into account the first and the second determined road stretches, a road stretch point ahead of the vehicle or a vehicle position for initiating the rolling or freewheeling mode for interrupting the force flow in the drive-train.

9. A control system of a vehicle, comprising a transmission control unit of a transmission, an engine control unit of a drive-train and a navigation device of the vehicle, which are interlinked with one another, wherein the transmission control unit carries out a method for controlling a rolling or freewheeling mode of a vehicle having the drive-train with a drive engine, an automatic or automated transmission and controllable shifting means for interrupting a force flow in the drive-train, the method including: determining a current vehicle position; determining, with reference to topographical data, a first road stretch between the current vehicle position and a road stretch section ahead along which a speed limit applies; calculating, while driving with the drive-train engaged, a predicted speed variation with the force flow in the drive-train interrupted for the road stretch section ahead; determining, as a function of the predicted speed variation, a second road stretch, which the vehicle covers with the force flow interrupted until a value of the predicted speed variation corresponds at least approximately to a value of the speed limit ahead; determining, taking into account the first and the second determined road stretches, a road stretch point ahead of the vehicle or a vehicle position for initiating the rolling or freewheeling mode for interrupting the force flow in the drive-train; and the transmission control unit actuates shifting means for interrupting the force flow in the drive-train when the vehicle is at the road stretch point or at the vehicle position upon reaching which a force flow interruption is permitted.

10. A computer program product with program code means which are stored on a computer-readable data support, the computer program product being run on one of a computer, a computation unit and a transmission control unit to carry out steps of a method according to claim 1.

\* \* \* \* \*